US009739404B2

(12) United States Patent
Jones et al.

(10) Patent No.: US 9,739,404 B2
(45) Date of Patent: Aug. 22, 2017

(54) BATTERY WATER REPLENISHMENT SYSTEM AND METHOD OF INSTALLATION

(71) Applicant: Philadelphia Scientific LLC, Montgomeryville, PA (US)

(72) Inventors: William E. M. Jones, Freeport (BS); Trevor Alden, Huntingdon Valley, PA (US)

(73) Assignee: Philadelphia Scientific LLC, Montgomeryville, PA (US)

( * ) Notice: Subject to any disclaimer, the term of this patent is extended or adjusted under 35 U.S.C. 154(b) by 0 days.

(21) Appl. No.: 14/260,000

(22) Filed: Apr. 23, 2014

(65) Prior Publication Data

US 2014/0319825 A1    Oct. 30, 2014

Related U.S. Application Data

(60) Provisional application No. 61/815,498, filed on Apr. 24, 2013.

(51) Int. Cl.
*F16L 37/00* (2006.01)
*F16L 37/092* (2006.01)
*H01M 2/36* (2006.01)

(52) U.S. Cl.
CPC ......... *F16L 37/0925* (2013.01); *H01M 2/362* (2013.01); *Y10T 29/49826* (2015.01)

(58) Field of Classification Search
USPC .................. 285/104–105, 243, 322–323, 39, 285/110–112; 277/647
See application file for complete search history.

(56) References Cited

U.S. PATENT DOCUMENTS

| | | | | |
|---|---|---|---|---|
| 2,265,267 A | * | 12/1941 | Cowles | F16L 37/113 251/149.6 |
| 3,591,205 A | * | 7/1971 | Hamburg | F16L 37/091 285/111 |
| 3,633,944 A | * | 1/1972 | Hamburg | F16L 17/035 285/111 |
| 3,743,326 A | * | 7/1973 | Courtot et al. | 285/105 |
| 3,837,687 A | * | 9/1974 | Leonard | F16L 17/035 277/615 |
| 3,909,046 A | * | 9/1975 | Legris | 285/39 |
| 3,963,267 A | * | 6/1976 | Legris | 285/93 |
| 3,999,783 A | * | 12/1976 | Legris | 285/24 |
| 4,594,734 A | * | 6/1986 | Vykukal | 2/2.12 |
| 4,606,783 A | * | 8/1986 | Guest | 285/323 |

(Continued)

*Primary Examiner* — Aaron Dunwoody
*Assistant Examiner* — Fannie Kee
(74) *Attorney, Agent, or Firm* — Riverside Law LLP

(57) ABSTRACT

A system for coupling a conduit to a valve is disclosed. The valve includes at least one coupling, wherein the coupling includes an inlet leading to an internal chamber of the valve, a collar positioned within the inlet, a gripper positioned partially within the inlet and in contact with at least a portion of the collar, and a wiper seal positioned within the internal chamber. The system further includes a conduit, wherein the conduit is insertable through the gripper via a first force, and wherein the conduit is subsequently insertable through the wiper seal via a second force that is less than the value of the first force. The conduit may optionally be labeled with a set of visual markings to provide proper cutting angles and to indication proper positioning of the conduit into the valve to effectuate a tight seal.

10 Claims, 5 Drawing Sheets

(56) References Cited

U.S. PATENT DOCUMENTS

| | | | |
|---|---|---|---|
| 4,645,246 A * | 2/1987 | Guest | 285/323 |
| 4,685,706 A * | 8/1987 | Kowal et al. | 285/322 |
| 4,958,858 A * | 9/1990 | Guest | 285/24 |
| 5,553,901 A * | 9/1996 | Serot | F16L 37/091 |
| | | | 285/322 |
| 5,927,975 A * | 7/1999 | Esrock | 433/80 |
| 6,305,722 B1 * | 10/2001 | Vieregge | 285/298 |
| 2005/0221166 A1 | 10/2005 | Jones et al. | |
| 2006/0226651 A1 * | 10/2006 | Griswold et al. | 285/322 |
| 2006/0228621 A1 | 10/2006 | Jones et al. | |
| 2010/0025079 A1 * | 2/2010 | Flynn | 174/21 JS |

\* cited by examiner

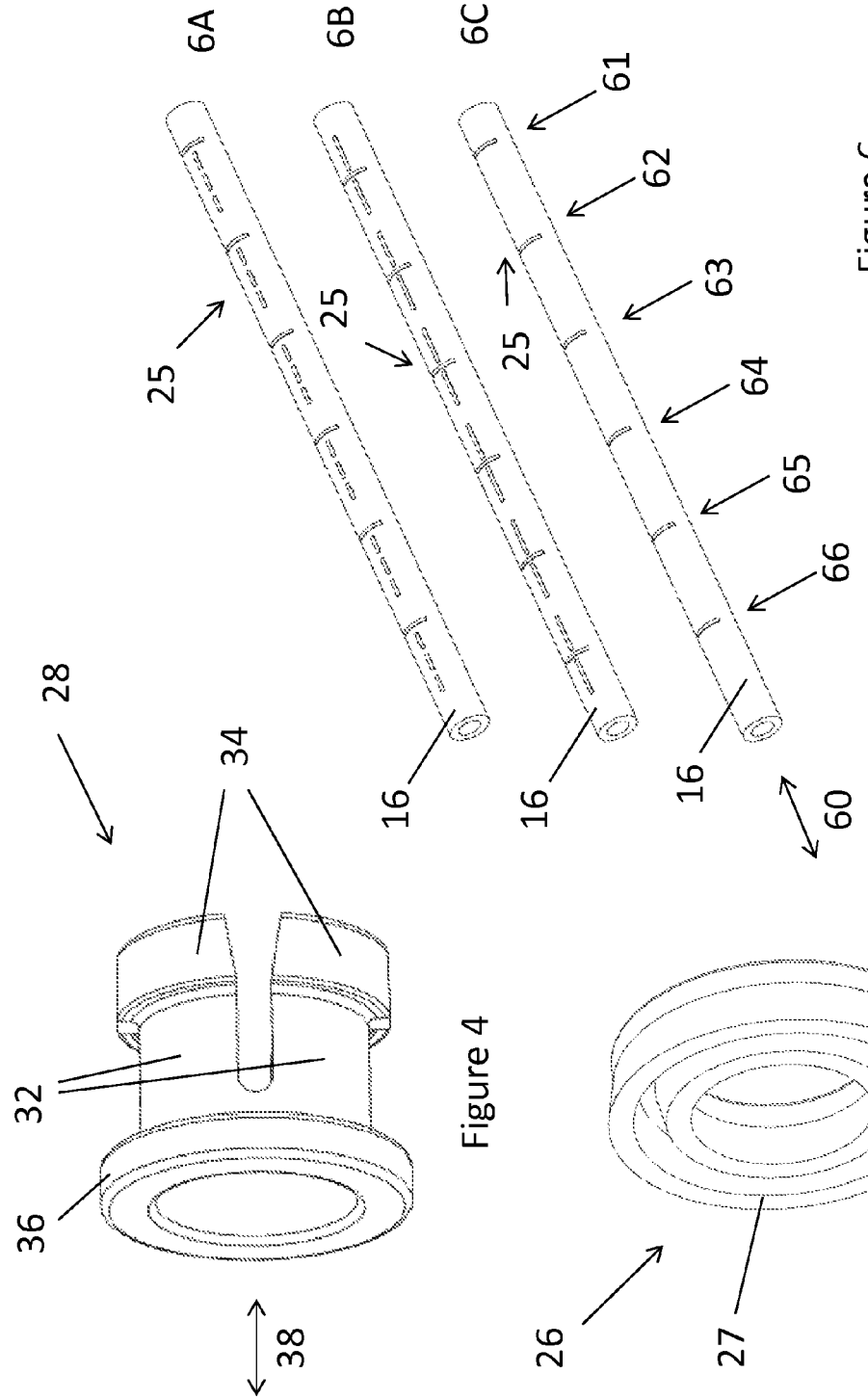

US 9,739,404 B2

BATTERY WATER REPLENISHMENT SYSTEM AND METHOD OF INSTALLATION

CROSS-REFERENCE TO RELATED APPLICATIONS

This application claims priority to U.S. Patent Application Ser. No. 61/815,498 filed Apr. 24, 2013, the entire disclosure of which is incorporated by reference herein in its entirety.

BACKGROUND OF THE INVENTION

Many industrial electrical batteries utilize aqueous electrolytes, such as lead-acid batteries that power fork-lift trucks. When charging these types of batteries, water in the electrolyte breaks down into oxygen and hydrogen gases via electrolysis. The gases bubble up through the electrolyte and escape from the battery housing through a vent opening. Consequently, the electrolysis causes a loss of water from the electrolyte solution, and as a result, such batteries require periodic replenishment of the lost water.

For large, multi-cell batteries, single point watering systems have been developed to avoid the error-prone, labor-intensive and tedious process of visually inspecting and manually watering each cell individually. Single point watering systems may include, for example, float valves positioned in each cell, with the cells linked together by a configuration of water supply conduits which feeds water to the cells through the float valves. When water replenishment is required, the water supply conduit system is connected to a water reservoir, water flows from the reservoir to the cells and the float valves close to cut off the flow of water once their respective cells are filled.

Unfortunately, a number of problems still remain, particularly relating to the proper installation of such systems. For example, the large number of battery cells result in large numbers of valves, each of which may be connected to two sections of conduit. Thus, each cell may require two connectors, and additional connectors will also be necessary to complete and cap the system. The most common tubing connection method uses flexible tubing and fittings having barbed ends. The fittings may be part of a valve, or may stand alone as required to effect the necessary connections. In constructing such a system, the end of a flexible tube is pushed directly on to a barbed fitting. Sometimes, a clamping ring is added to hold the tube in place against high water pressure. While this method is inexpensive and operates satisfactorily in most applications, it is both laborious and time-consuming to install on the battery. For example, typically an installer will use a heating system such as an oven, hot air gun or hot water to soften the tubing before pushing it on to the barbed fitting. The tubing shrinks as it cools to make a tight connection. However, if a moderately high pressure is to be used, say 30 psi or more, the installer will use the additional ring clamps to prevent the tubing from blowing off the barbed fitting. Since there may be well over 80 connections of this type to make on a single 40 cell battery, it is clear that a better and quicker attachment means would be preferred by users.

There is a type of quick connect coupling that has found use in household plumbing systems as well as hydraulic oil systems for industry. Such quick connect couplings allow a conduit to be inserted into the coupling where it is held fast in a fluid tight connection using a seal such as an O-ring and a retainer positioned within the coupling. The retainer has a set of metal teeth that are forced into engagement with the conduit. The teeth cut into the tubing, which is usually plastic, and hold it firmly in sealing relation with the coupling. Internal pressure or external forces that would tend to withdraw the conduit from the coupling are resisted by the teeth, which are integrated in any one of a number of self-jamming arrangements that cause them to engage the conduit with a force proportional to the applied force tending to withdraw the conduit from the coupling.

A similar type of quick connect coupling mechanism for use in battery water replenishment systems was described in U.S. Patent Application Publication No. 2006/0228621, the entire contents of which are incorporated by reference herein in its entirety. However, while the aforementioned water replenishment system provides numerous efficiencies, there is still tendency for error in properly securing the conduit to the valve to create a leak-free seal. For example, there is a tendency of installers to believe the conduit has been securely attached to the valve coupling, when in fact the conduit has only been received by the retainer member and not the O-ring seal behind the retainer member within the internal chamber of the valve coupling. Because the O-ring is not visible to the installer, the installer must determine by feel whether or not the conduit has in fact engaged the O-ring to create the compression seal necessary to prevent leakage. Unfortunately, because the amount of force required to insert the conduit through the O-ring seal of the coupling is significantly greater than the amount of force needed to insert the conduit first through the retainer member, the installer can mistakenly believe the conduit has been secured, when in fact it the distal end of the conduit is merely positioned between the retainer member and the O-ring, which results in leakage at the valve coupling.

Thus, there is a need in the art for a quick connect coupling system and method that provides consistent installation and effective sealing. The present invention satisfies this need.

SUMMARY OF THE INVENTION

The present invention relates to a valve coupling for receiving a conduit. The valve coupling includes a housing having an inlet leading to an internal chamber, wherein the inlet is sized to receive a conduit, a collar positioned within the inlet, a gripper positioned partially within the inlet and in contact with at least a portion of the collar, and a wiper seal positioned within the internal chamber, wherein the gripper and wiper seal are sized to receive and engage the gripper and wiper seal to create a fluidly sealed coupling. In one embodiment of the coupling, the wiper seal is a U-cup seal. In another embodiment of the coupling, the force required for the conduit to engage the gripper is greater than the force required for the conduit to engage the wiper seal. In another embodiment of the coupling, the force required to engage the gripper is less than 2 lbs. In another embodiment of the coupling, the force required to engage the wiper seal is less than 1 lbs. In another embodiment of the coupling, the coupling is composed of non-corrosive materials.

The present invention also relates to a system for coupling a conduit to a valve. The system includes, a valve housing having at least one inlet leading to an internal chamber, a collar positioned within the inlet, a gripper positioned partially within the inlet and in contact with at least a portion of the collar, a wiper seal positioned within the internal chamber, and a conduit, wherein the conduit is insertable through the gripper via a first force, and wherein the conduit is subsequently insertable through the wiper seal via a second force that is less than the value of the first force. In one embodiment of the system, the wiper seal is a U-cup seal. In another embodiment of the system, the force required for the conduit to engage the wiper seal is less than half of the force required for the conduit to engage the gripper. In another embodiment of the system, the force required to engage the gripper is less than 2 lbs. In another embodiment of the system, the force required to engage the wiper seal is less than 1 lbs. In another embodiment of the system, the valve is composed of non-corrosive materials. In another embodiment of the system, the conduit is labeled with a plurality of visual markings. In another embodiment of the system, each of the visual markings create a series of repeating marking sets that are equidistant from each other along the length of the conduit. In another embodiment of the system, each visual marking designates a cutting angle at which to cut the conduit. In another embodiment of the system, the location of the visual marking adjacent to a cut visual marking in reference to the inlet is an indicator of whether or not the conduit has been effectively inserted into the valve to create a seal.

The present invention further relates to a method of assembling a watering system to a multi-cell battery. The method includes the steps of placing a valve into each cell of a multi-cell battery, where the valve includes at least one coupling, wherein the at least one coupling includes a housing having an inlet leading to an internal chamber, a collar positioned within the inlet, a gripper positioned partially within the inlet and in contact with at least a portion of the collar, and a wiper seal positioned within the internal chamber, obtaining a conduit labeled with a plurality of visual markings, cutting the conduit at one of the visual markings, and inserting the cut end of the conduit into the gripper and subsequently into the wiper seal of the coupling, such that the location of the visual marking adjacent to the cut visual marking in reference to the inlet indicates whether or not the conduit has been effectively inserted into the coupling to create a seal. In one embodiment of the method, each of the visual markings create a series of repeating marking sets that are equidistant from each other along the length of the conduit. In another embodiment of the method, each visual marking designates a cutting angle at which to cut the conduit. In another embodiment of the method, the force required for the conduit to engage the gripper is greater than the force required for the conduit to engage the wiper seal. In another embodiment of the method, the force required to engage the gripper is less than 2 lbs. In another embodiment of the method, the force required to engage the wiper seal is less than 1 lbs.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 4 is a perspective view of an exemplary gripper, according to an aspect of the present invention.

FIG. 5 is a perspective view of an exemplary U-cup, according to an aspect of the present invention.

FIG. 6 is a perspective view of a series of conduits having a variety of visual markings, according to an aspect of the present invention.

DETAILED DESCRIPTION

Figure 1:
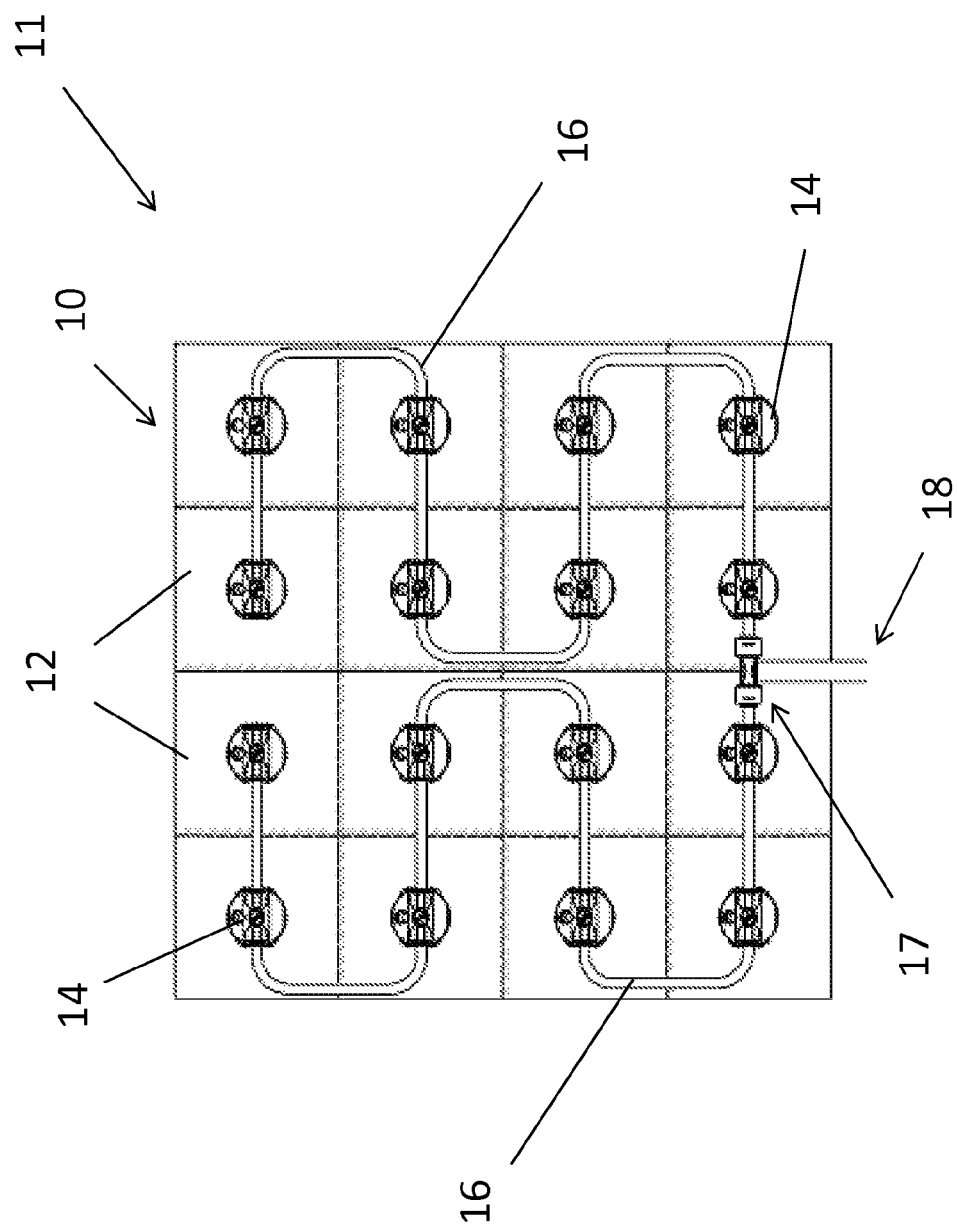
FIG. 1 is a plan view of a battery having an exemplary single point watering system incorporating valves and conduits, according to an aspect of the present invention.

It is to be understood that the figures and descriptions of the present invention have been simplified to illustrate elements that are relevant for a clear understanding of the present invention, while eliminating, for the purpose of clarity, many other elements found in typical battery water replenishment systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

A "push fit" mechanism, as used herein, refers to the design and interaction of a gripper with a valve collar when a conduit engages a valve coupling. The installer of the present invention engages the push fit mechanism when inserting the end of a conduit into and through the gripper of the coupling.

The term "internal chamber" as used herein refers to a space or passage within the valve. The internal chamber may have one or multiple access points for water to flow into the valve to replenish the battery cell with water, and to optionally act as a passage for the flow of water to exit the valve, such that the flow of water can continue to another fluidly connected valve. Thus, an internal chamber may further be defined as a passage, cavity or any other type of internal compartment of the valve.

The term "opening" as used herein refers to a port or otherwise an inlet or outlet point through the valve housing to an internal chamber of the valve. As used herein, the opening is described as the inlet or outlet point of a valve coupling, and therefore may alternatively be referred to as a tube port or filling port.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Figure 2:
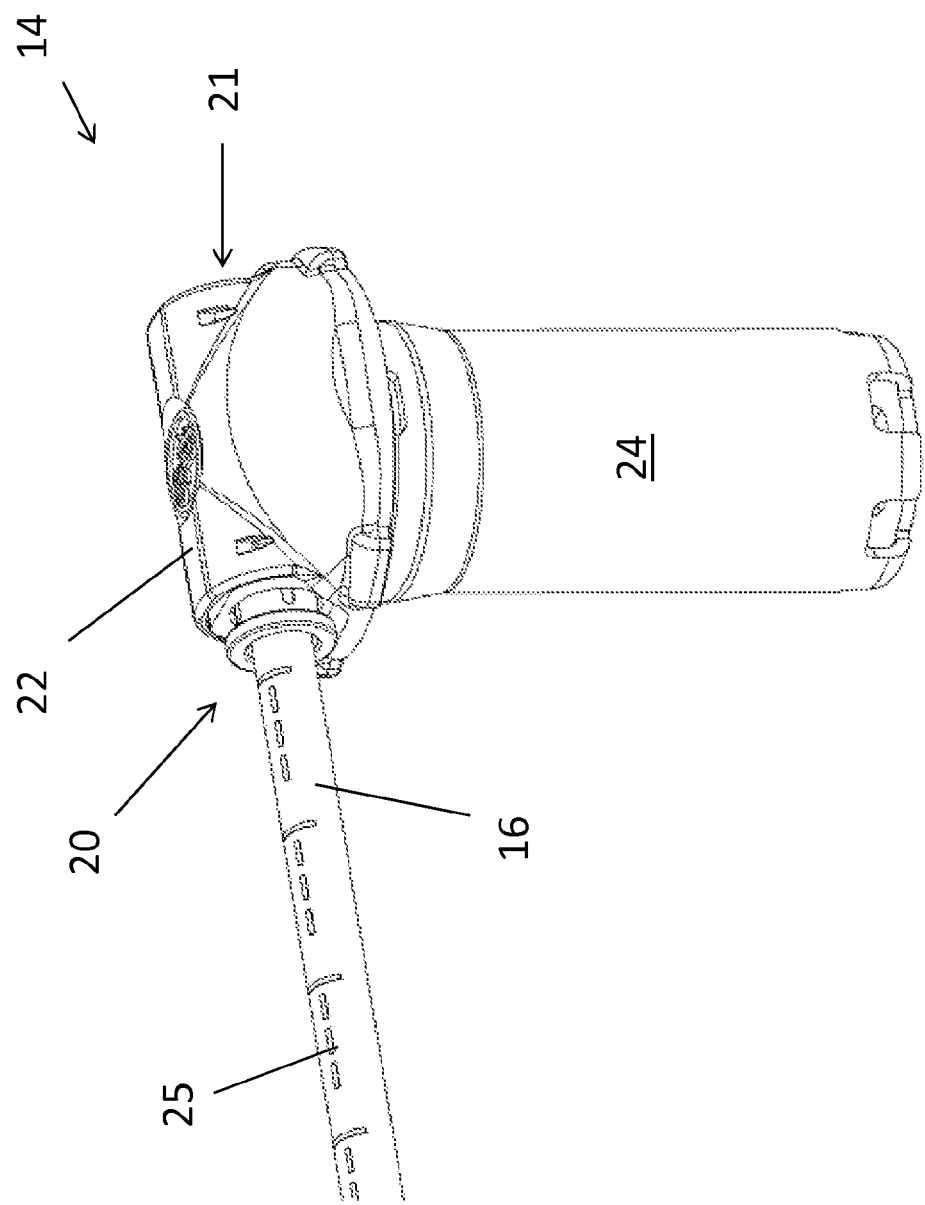
FIG. 2 is a perspective view of an exemplary valve assembly and conduit, according to an aspect of the present invention.
Figure 3A:
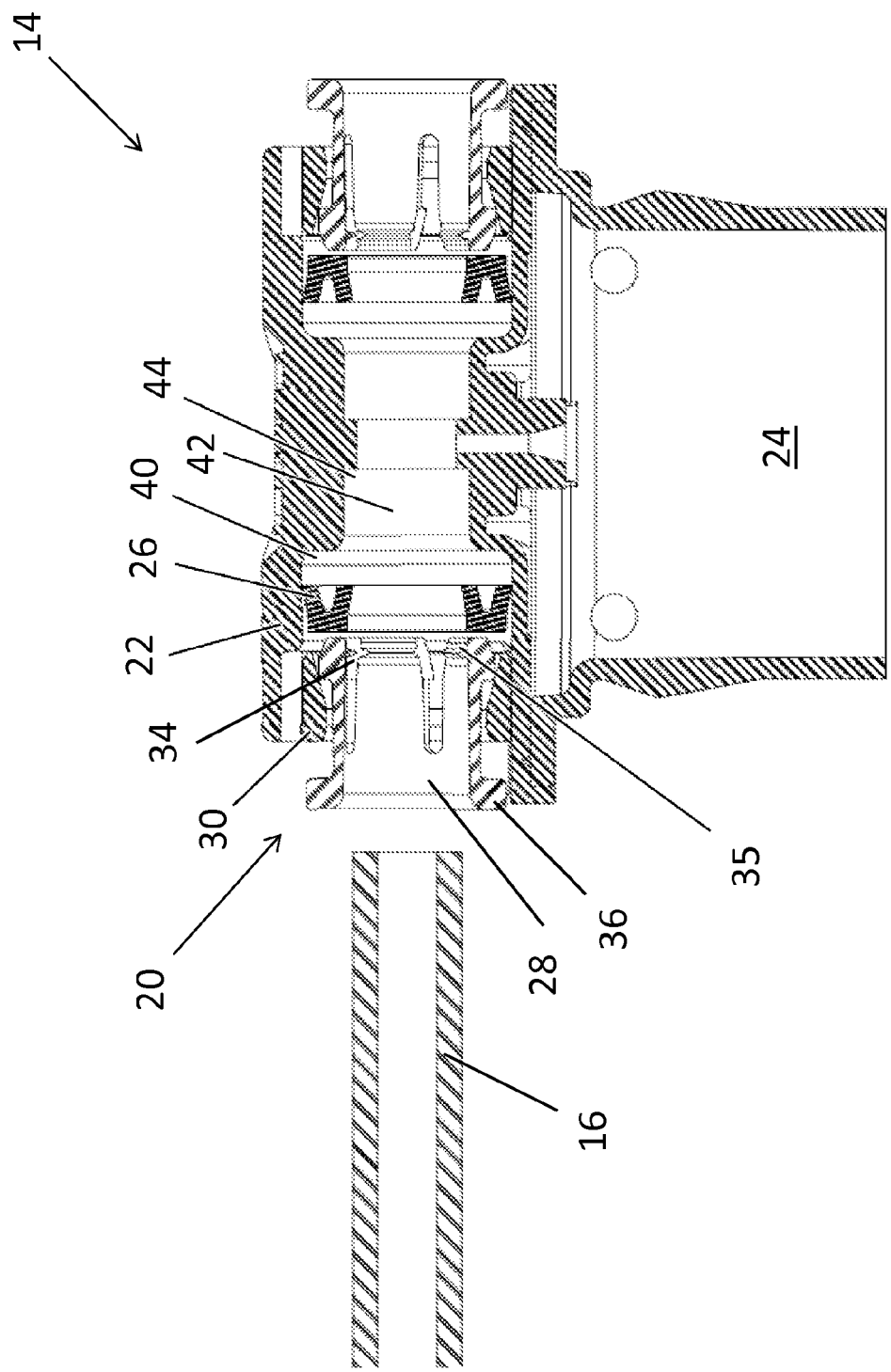
FIG. 3A is a sectional view of an exemplary valve assembly and coupling, according to an aspect of the present invention.
Figure 3B:
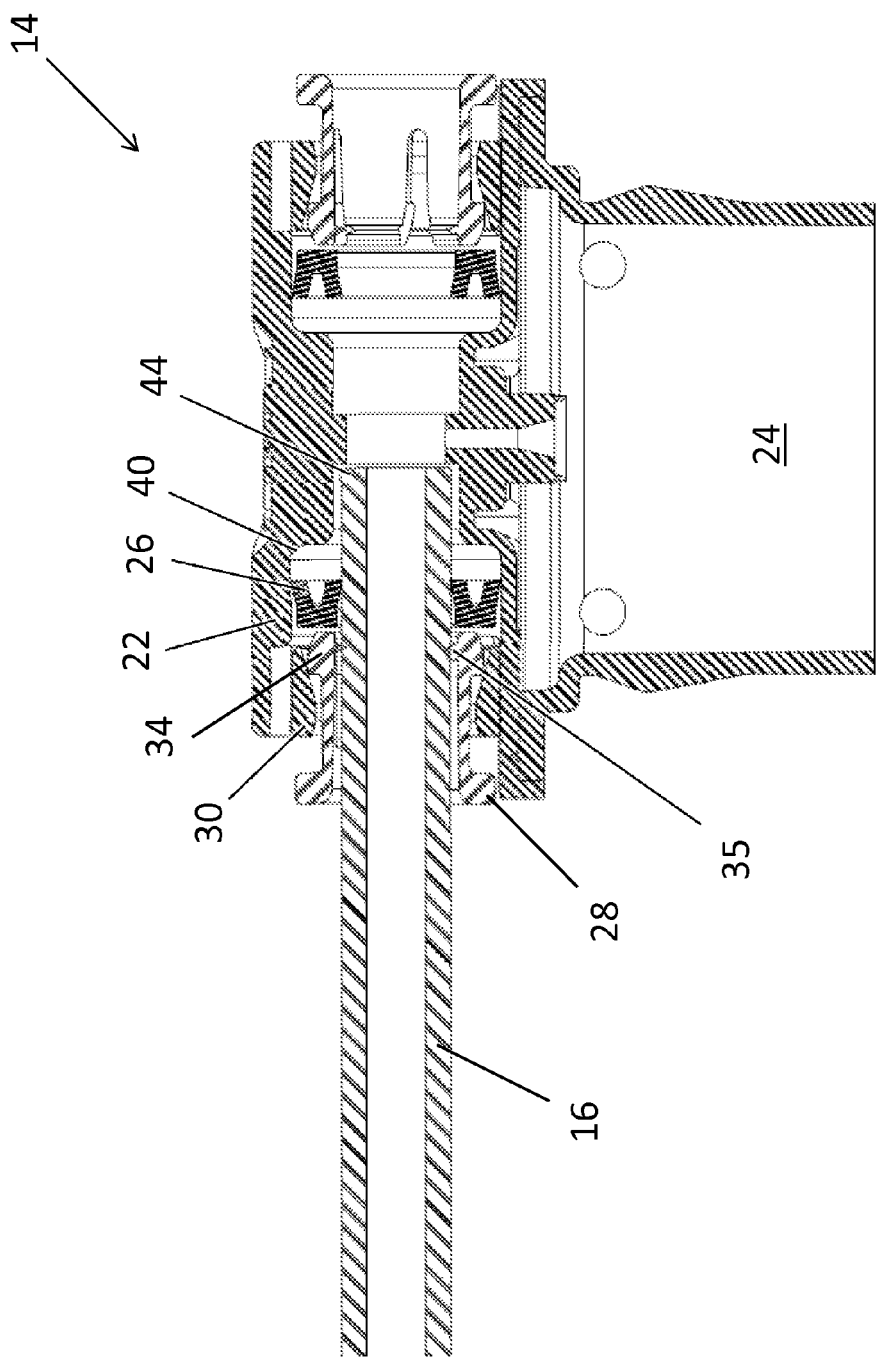
FIG. 3B is a sectional view of the valve assembly with a conduit inserted into the coupling, according to an aspect of the present invention.

The present invention includes an improved battery water replenishment system and method of installation. FIG. 1 shows an exemplary battery 10, for example, a lead-acid battery, having a plurality of cells 12 containing a liquid electrolyte, such as aqueous sulfuric acid. Cells 12 (sixteen cells as shown) are replenished with water from a reservoir (not shown) through a single point watering system 11 at entry point 18. As contemplated herein, watering system 11 is formed from conduit 16 that is connected to one or more series of valves 14 through stand alone quick connect couplings 17, as well as quick connect couplings 20 that may be an integral part of each valve 14, as shown in FIGS. 2, 3A and 3B. Stand-alone couplings 17 may include straight through couplings, "tee" couplings, cruciform couplings, elbows or any other coupling as would be understood by those skilled in the art. While watering system 11 as shown in FIG. 1 includes two series of fluidly connected valves 14 in parallel, watering system 11 may utilize any combination and configuration of fluidly connected valves for transporting water and filling any number of battery cells, and therefore is not limited to any particular battery type, number of cells or configuration of valve/conduit connection.

According to an aspect of the present invention, FIG. 2 shows a valve assembly 14 for use within a multi-cell battery having a shared water filling system, such as described in FIG. 1. Valve assembly 14 includes an upper housing portion 22 having one or more couplings 20 and 21, and a lower housing portion 24 having a float therein (not shown). As illustrated, conduit 16 is inserted into valve assembly 14 at an inlet coupling 20 to permit water to flow into and fill the cell (not shown), and to exit valve assembly 14 via an outlet coupling 21 to other fluidly connected valve assemblies and cells. Conduit 16 may further include visual markings 25, to aid in securely placing conduit 16 into valve assembly 14 to prevent unwanted water leakage. In some embodiments of the present invention, housing portion 22 may include one or more visual windows to see or inspect the internal components of couplings 20 and/or 21. For example, all or a portion of the top of housing 22 may be composed of a see-through polymer, thereby allowing an installer or user of the watering system to see the internal valve components, or to inspect the positioning of the conduit when inserted into the coupling, to insure proper installation. Further, if the conduit includes one or more visual markings, these markings can also be viewed by the one or more windows within the top of housing 22. Valve assembly 14 is preferably a float valve that controls the flow of water to the cell and maintains it at a desired level. As contemplated herein, the float actuates a valve closing member within the valve when buoyed upwardly by the battery cell electrolyte fluid to a position indicative of a full cell. A representative float valve is shown in published U.S. Patent Published Application Nos. 2005/0221166 and 2006/0228621, which are each hereby incorporated by reference in their entirety.

As illustrated in FIGS. 3A and 3B, valve assembly 14 includes housing 22 having positioned therein at least one coupling, and preferably two couplings 20 and 21 functioning as an inlet and outlet to valve assembly 14, respectively. Such couplings according to the invention may be used as stand alone devices or with valves to provide a single point or reduced number point watering system for batteries that does not suffer from the problems of corrosion, excessive cost and high part count, and provide a system that is easy to install rapidly to provide reliable, fluid tight joints. It should be appreciated that valve assembly 14 may be designed for any number of coupling regions, such as 1, 2, 3, 4, 5 or 6 coupling regions, for fluidly connecting and transporting water into each cell of the battery in any conduit connection pattern desired. As contemplated herein, each coupling region of valve assembly 14 may function as generally described herein for inlet coupling 20.

Coupling 20 includes an opening to an internal chamber within housing 22 of valve 14, having positioned therein a U-cup seal 26 (FIG. 5), and a gripper 28 (FIG. 4) positioned partially within the internal chamber, such that a portion of gripper 28 extends outwardly from the opening of coupling 20 in housing 22. For example, referring to both FIGS. 3A and 4, gripper 28 may include a proximal ring or flange 36 having a diameter that is greater than the diameter of the opening, such that when the distal end of gripper 28 is inserted into the opening, the proximal ring 36 catches the outer surface of housing 22 around the opening and remains outside housing 22.

A collar 30 is positioned within and forms part of the opening into housing 22 at coupling 20. Collar 30 may be a separate member as shown in FIGS. 3A and 3B, or it may be integrally molded as part of the housing. As shown in FIGS. 3A and 3B, collar 30 may include a tapered bore defined by a smaller diameter and a larger diameter, where the smaller diameter of the bore faces the opening to housing 22, and the larger diameter facing away therefrom into the internal chamber. As contemplated herein, the diameter of the bore may generally increase in a direction moving away from the opening to increase resistance to gripper 28 from being pulled out of the opening. Further, because the smallest diameter of the bore creates the leading edge of the tapered surface of collar 30, gripper 28 may be inserted and/or removed through collar 30 numerous times without ripping, tearing or otherwise unnecessarily damaging the flexible fingers 32 or teeth 34 of gripper 28.

As described elsewhere herein, gripper 28 is disposed within collar 30 such that it extends from the exterior of housing 22. As shown in FIGS. 3A, 3B and 4, gripper 28 may include a plurality of flexible fingers 32 connected to one another near its proximal end. Preferably, fingers 32 are connected to one another by being attached to ring 36, such that ring 36 and fingers 32 form a collet that is axially moveable relatively to collar 30. An axis 38 extending longitudinally and defining the axial direction of motion of the formed collet is shown for orientation purposes. As shown in FIG. 4, fingers 32 are positioned relative to one another so as to receive conduit 16 between them. Each finger 32 has a tooth 34 positioned at the distal end of gripper 28. Each tooth 34 may project inwardly so as to engage conduit 16 when conduit 16 is inserted through gripper 28 and into the internal chamber. Each tooth may also have an edge 35 for contacting conduit 16. Configurations for each tooth 34 may include, without limitation, a flat edge, a circumferentially curved edge, and the like, and may further be a sharp or fine edge to provide a positive bite against conduit 16.

As described elsewhere herein and referring to FIGS. 3A, 3B and 5, U-cup seal 26, such as a straight lip U-cup (Precision Associates, Inc.), is positioned within the internal chamber to engage conduit 16 to provide a seal. The U-cup seal is captured between the distal end of gripper 28 and a shoulder 40 within the internal chamber, and provides sealing engagement with conduit 16 when conduit 16 is inserted into and through the lumen of gripper 28 and further inserted through U-cup seal 26 as shown in FIG. 3B. Preferably, the internal chamber also includes a socket 42 positioned adjacent to shoulder 40 that receives conduit 16 and further includes another shoulder 44 that acts as a stop for the end of conduit 16. As contemplated herein, U-cup seal 26 may include any configuration of interior lip 23 and exterior lip 27 as would be understood by those skilled in the art. For example, the seal may alternatively be a V-cup seal, or any other shaped sealing component that provides the functionality of a wiper seal.

The components of the present invention, including the housing, collar, gripper and U-cup seal, may be formed from any polymeric material, such as acid resistant plastics, and particularly plastics that are resistant to sulfuric acid. Such plastics include, by non-limiting examples polyethylene, polypropylene, polycarbonate or ABS plastic. Rubber may also be used, and generally any non-corrosive material is preferred. In certain embodiments, the U-cup may be composed of viton, buna nitrile, EPDM, santoprene, thermoset materials, or rubber compounds. In certain embodiments, the gripper may be composed of thermoplastics, such as polypropylene, ABS or polycarb. Preferably, the material for the teeth is rigid enough to engage the tubing. By making the gripper entirely from acid resistant plastic and avoiding the use of metal, several advantages are realized. First, the problem of corrosion that is associated with metal teeth is avoided. The acid environment of the battery causes accelerated corrosion of metal parts and will thus cause couplings having metal components to fail rapidly, requiring frequent replacement. Second, the cost is significantly less than one which includes metal teeth integrally molded within the fingers. Finally, the plastic gripper has a lower part count, thereby achieving simplicity of design. It is thought throughout the industry that metal teeth are necessary to ensure a reliable connection between the coupling and the conduit, and that plastic teeth will not be adequate. However, tests have shown that for self-watering battery systems as described herein, a plastic gripper having plastic teeth performs adequately and provides a reliable, fluid-tight joint, particularly in combination with U-cup seal.

Conduit 16 may be composed of any sort of soft or rigid tubing. In a preferred embodiment, conduit 16 is a flexible, acid resistant plastic tubing, such as PVC. In other embodiments, the conduit may be composed of polyethylene, polypropylene, santoprene, or any other flexible material. The embodiments thus described are preferred for conduit having a diameter up to about 12 mm. It should be appreciated that for larger diameter conduit, it may be desirable to reinforce the conduit with a ferrule, which may be made of a relatively hard or rigid plastic and inserted within the end of the conduit to reinforce it and prevent collapse when the gripper teeth are forced radially inwardly to prevent withdrawal of the conduit from the housing by engagement of the fingers with the tapered bore of the collar.

As shown in FIGS. 2 and 6, conduit 16 may further include one or more markings 25. When installing the watering system of the present invention, the installer must cut a supply of tubing to the desired length between each valve and insert the ends of the tubing into the respective valve coupling according to the desired conformation of water flow connections. To assist the installer in cutting the tubing at the proper length and at the proper angle, markings 25 may serve as a guideline or tracer line to achieve the desired cut. For example, as shown in FIG. 6C, the markings may include a series of lines 61-66 that are substantially vertical along the length of the tube, or otherwise perpendicular to the axial, longitudinal flow path 60 of water through the tubing. As contemplated herein, markings 25 may include use of lines, dots or dash-line patterns, or any other design or combination of designs that aids in the cutting of the tube in the desired location and at the desired angle. Furthermore, markings 25 may include any color scheme or combination of colors. In the embodiment of FIG. 6C, lines 61-66 may be single lines having a substantially equal distance between them, and further the distance between each line may be equal to or less than the distance between the edge of housing 22 at the opening to shoulder 44 within the internal chamber of valve 14, which may be about ⅝ inches, for example. However, it should be appreciated that the actual distance between markings, or the distance between the edge of housing 22 to shoulder 44 is not limited to any particular measurement. Rather, it is preferred that the distance between the conduit markings and the distance between the edge of housing 22 to shoulder 44 is proportional, such that the markings of conduit 16 provide a visual guide to the installer that the conduit has been inserted properly. In this embodiment, an installer would cut conduit 16 along line 61 to provide a new distal tube end having a surface that is substantially perpendicular to axis 60. Then when the installer fully inserts the newly cut distal tube end into coupling 20, such that the new distal tube end contacts shoulder 44, line 62 passes underneath ring 36 of gripper 28, such that line 62 is no longer visible. Thus, the installer knows that, after cutting conduit 16 at one of the markings, conduit 16 must be inserted deep enough into coupling 20 such that the next subsequent marking in the series passes underneath ring 36 for conduit 16 to be properly inserted. Consequently, the installer also knows that if they can still see the next marking in the series after cutting, the conduit has not been properly inserted and the valve may be subject to leakage. Likewise, the patterns of FIGS. 6A and 6B can be similarly used to provide the proper tube cutting angle and determine the proper insertion distance of the conduit.

The operation of the quick connect couplings according to the invention is described with reference to FIGS. 3A and 3B. Conduit 16 is aligned with the ring 36 of gripper 28. Next, conduit 16 is inserted into gripper 28, past teeth 34, and through U-cup seal 26 so that it seats within the housing socket 42 with the distal end abutting shoulder 44. Engagement between the wiper seal and the conduit outer surface provides a fluid-tight connection. Teeth 34 also engage the outer surface of conduit 16. Fingers 32 are deflected outwardly by engagement of teeth 34 with the conduit. If the conduit is moved so as to withdraw it out from the coupling, both the gripper and the conduit begin to move axially to the left within the housing. However, the distal ends of fingers 32 engage the tapered bore of collar 30, and the angularly oriented surface of the tapered bore forces teeth 34 into tighter engagement with the conduit, the engagement force between the teeth and the conduit increasing with increasing force applied to withdraw the conduit from the housing. Teeth 34 grip conduit 16 and prevent or at least resist its removal. The conduit may be removed, however, by pushing gripper 28 into the internal chamber of housing 22 which prevents gripper 28 from moving axially and disengages fingers 32 from engagement with the tapered bore. With the gripper held in this position, the conduit may be withdrawn from the housing.

It should be appreciated that incorporation of a wiper seal, such as a U-cup seal, significantly reduces the amount of force needed to insert the conduit as compared to an O-ring that creates a compression seal. For example, it has been found that the force required to insert a standard conduit into the gripper is 1.3-1.6 lbs. Additionally, it has been found that the force required to insert a standard conduit into a 70 A O-ring is 4.2-4.6 lbs., white the force required to insert a standard conduit into a U-cup is between 0.6-0.8 lbs. Because the required force needed to insert the conduit into the O-ring is more than 3 times the force needed to insert the conduit through the gripper, an installer can be easily mistaken into thinking that the conduit is in place after applying the needed force to get past the gripper, without realizing that additional force is needed to continue to push the conduit through the O-ring. However, because the U-cup of the present invention works as a wiper seal and not as a compression seal, the amount of force needed to push the conduit through the U-cup seal of the present invention is reduced to an amount that is less than the force required to push past the gripper. Because the force required to pass through the U-cup seal is less than the force required to pass through the gripper, the installer is not required to generate a greater force when continuing to insert the conduit into the coupling, thereby allowing for an easier and intuitive insertion process that significantly reduces assembly error and prevents unwanted leakage.

Accordingly, the present invention includes systems and methods for coupling a conduit to a valve, and to methods of assembling a watering system to a multi-cell battery.

For example, the system includes a valve housing having at least one inlet leading to an internal chamber, a collar positioned within the inlet, a gripper positioned partially within the inlet and in contact with at least a portion of the collar, a wiper seal positioned within the internal chamber, and a conduit, wherein the conduit is insertable through the gripper via a first force, and wherein the conduit is subsequently insertable through the wiper seal via a second force that is less than the value of the first force. In one embodiment of the system, the wiper seal is a U-cup seal. In another embodiment of the system, the force required for the conduit to engage the wiper seal is less than half of the force required for the conduit to engage the gripper. In another embodiment of the system, the force required to engage the gripper is less than 2 lbs. In another embodiment of the system, the force required to engage the wiper seal is less than 1 lbs. In another embodiment of the system, the valve is composed of non-corrosive materials. In another embodiment of the system, the conduit is labeled with a plurality of visual markings. In another embodiment of the system, each of the visual markings create a series of repeating marking sets that are equidistant from each other along the length of the conduit. In another embodiment of the system, each visual marking designates a cutting angle at which to cut the conduit. In another embodiment of the system, the location of the visual marking adjacent to a cut visual marking in reference to the inlet is an indicator of whether or not the conduit has been effectively inserted into the valve to create a seal.

In another example, the methods of assembling a watering system to a multi-cell battery include the steps of placing a valve into each cell of a multi-cell battery, cutting the conduit at one of the visual markings, and inserting the cut end of the conduit into the gripper and subsequently into the wiper seal of the coupling, such that the location of the visual marking adjacent to the cut visual marking in reference to the inlet indicates whether or not the conduit has been effectively inserted into the coupling to create a seal. In one embodiment of the method, each of the visual markings create a series of repeating marking sets that are equidistant from each other along the length of the conduit. In another embodiment of the method, each visual marking designates a cutting angle at which to cut the conduit. In another embodiment of the method, the force required for the conduit to engage the gripper is greater than the force required for the conduit to engage the wiper seal. In another embodiment of the method, the force required to engage the gripper is less than 2 lbs. In another embodiment of the method, the force required to engage the wiper seal is less than 1 lbs.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A valve coupling for receiving a conduit, comprising:
   a housing having an inlet leading to an internal chamber having a shoulder within the internal chamber, wherein the inlet is sized to receive a conduit;
   a collar positioned within the inlet;
   a gripper having a distal end positioned partially within the inlet and the collar and in contact with at least a portion of the collar; and
   a wiper seal positioned within the internal chamber between the shoulder of the internal chamber and the distal end of the gripper;
   wherein the gripper and wiper seal are sized to receive and engage the conduit to create a fluidly sealed coupling;
   wherein the force required for the conduit to engage the gripper is greater than the force required for the conduit to engage the wiper seal;
   wherein the force required to engage the gripper is less than 2 lbs; and
   wherein the force required to engage the wiper seal is less than 1 lb.

2. The coupling of claim 1, wherein the wiper seal is a U-cup seal.

3. The coupling of claim 1, wherein the coupling is composed of non-corrosive materials.

4. A system for coupling a conduit to a valve, comprising:
   a valve comprising a valve housing having at least one inlet leading to an internal chamber having a shoulder within the internal chamber;
   a collar positioned within the inlet;
   a gripper having a distal end positioned partially within the inlet and the collar and in contact with at least a portion of the collar;
   a wiper seal positioned within the internal chamber between the shoulder of the internal chamber and the distal end of the gripper; and
   a conduit;

wherein the conduit is insertable through the gripper via a first force;

wherein the conduit is subsequently insertable through the wiper seal via a second force that is less than the value of the first force;

wherein the force required for the conduit to engage the wiper seal is less than half of the force required for the conduit to engage the gripper;

wherein the force required to engage the gripper is less than 2 lbs; and wherein the force required to engage the wiper seal is less than 1 lb.

5. The system of claim 4, wherein the wiper seal is a U-cup seal.

6. The system of claim 4, wherein the valve is composed of non-corrosive materials.

7. The system of claim 4, wherein the conduit is labeled with a plurality of visual markings.

8. The system of claim 7, wherein each of the plurality of visual markings creates a series of repeating marking sets that are equidistant from each other along a length of the conduit.

9. The system of claim 7, wherein each of the plurality of visual markings designates a cutting angle at which to cut the conduit.

10. The system of claim 7, wherein a location of at least one of the plurality of visual markings adjacent to a cut visual marking in reference to the inlet is an indicator of whether or not the conduit has been effectively inserted into the valve to create a seal.

* * * * *